United States Patent
Yu et al.

(10) Patent No.: US 11,144,445 B1
(45) Date of Patent: Oct. 12, 2021

(54) USE OF COMPRESSION DOMAINS THAT ARE MORE GRANULAR THAN STORAGE ALLOCATION UNITS

(71) Applicant: EMC Corporation, Hopkinton, MA (US)

(72) Inventors: Rong Yu, West Roxbury, MA (US); Michael Scharland, Franklin, MA (US); Jeremy O'Hare, Westborough, MA (US)

(73) Assignee: Dell Products L.P., Hopkinton, MA (US)

( * ) Notice: Subject to any disclaimer, the term of this patent is extended or adjusted under 35 U.S.C. 154(b) by 941 days.

(21) Appl. No.: 15/082,679

(22) Filed: Mar. 28, 2016

(51) Int. Cl.
*G06F 12/08* (2016.01)
*G06F 12/02* (2006.01)
*G06F 12/0802* (2016.01)

(52) U.S. Cl.
CPC ........ *G06F 12/023* (2013.01); *G06F 12/0802* (2013.01); *G06F 2212/1044* (2013.01); *G06F 2212/401* (2013.01); *G06F 2212/60* (2013.01)

(58) Field of Classification Search
CPC . G06F 12/1458; G06F 12/0802; G06F 12/023
See application file for complete search history.

(56) References Cited

U.S. PATENT DOCUMENTS

| | | | | |
|---|---|---|---|---|
| 5,305,295 | A * | 4/1994 | Chu | G11B 20/00007 341/55 |
| 8,504,787 | B1 * | 8/2013 | Graves | G06F 11/3442 711/162 |
| 9,110,910 | B1 * | 8/2015 | Li | G06F 17/30194 |
| 2011/0219153 | A1 * | 9/2011 | Amit | G06F 13/12 710/68 |
| 2012/0158647 | A1 * | 6/2012 | Yadappanavar | G06F 16/1744 707/609 |
| 2016/0004642 | A1 * | 1/2016 | Sugimoto | G06F 3/06 711/128 |
| 2017/0123679 | A1 * | 5/2017 | Yoshii | G06F 3/0608 |
| 2018/0191370 | A1 * | 7/2018 | Li | G06F 16/1744 |

* cited by examiner

*Primary Examiner* — Ryan Bertram
*Assistant Examiner* — Trang K Ta
(74) *Attorney, Agent, or Firm* — Anderson Gorecki LLP

(57) ABSTRACT

Within a storage array, allocation of physical storage capacity within a storage array may be managed in standard size allocation units of uncompressed data, e.g. 128kb tracks, while smaller sub-allocation unit compression domains, e.g. 32kb quarter tracks, are used for compressed data. The data within a sub-allocation unit may be compressed to a size that is less than the capacity of the sub-allocation unit. Data associated with sub-allocation units that are not required to service a read or write may not need to be compressed or decompressed in order to service the read or write. Consequently, resource usage may be more efficient.

20 Claims, 7 Drawing Sheets

USE OF COMPRESSION DOMAINS THAT ARE MORE GRANULAR THAN STORAGE ALLOCATION UNITS

BACKGROUND

The subject matter of this disclosure is generally related to data storage systems that may be used to maintain large data sets and support multiple host applications and concurrent users. A data storage system may include multiple storage arrays. Each storage array may include multiple computing nodes. The computing nodes manage access to tangible data storage devices. Each storage array presents one or more logical volumes of storage to host applications running on a host device. The host applications may access the logical volumes by sending IOs to the storage arrays. The computing nodes maintain an abstraction layer between the logical volumes and the tangible data storage devices.

SUMMARY

All examples, aspects and features mentioned in this document can be combined in any technically possible way.

In accordance with an aspect an apparatus comprises: a storage array comprising: a plurality of tangible data storage devices; and a computing node comprising a processor and a cache, wherein the computing node presents a production volume to a host application and, in response to an IO request from the host application, the processor determines whether data corresponding to the IO request is in a compressed state or an uncompressed state on the tangible storage devices, and wherein the processor copies allocation units of data between the cache and the tangible storage devices to service the IO request when the data is uncompressed, and wherein the processor copies sub-allocation units of data between the cache and the tangible storage devices to service the IO request when the data is compressed, the sub-allocation units having a smaller size than the allocation units. In some implementations the processor identifies the sub-allocation units based on one or more of address and sector information in the IO request. In some implementations the processor identifies compressed sub-allocation units corresponding to the identified sub-allocation units. In some implementations hints indicate the locations of the compressed sub-allocation units in one or more back end sub-allocation units. In some implementations the hints comprise an offset value. In some implementations one allocation unit corresponds to n sub-allocation units. In some implementations the processor responds to a read request by copying compressed data of fewer than n sub-allocation units to cache from the tangible data storage devices. In some implementations the processor responds to a write request by destaging compressed data of fewer than n sub-allocation units from the cache to the tangible data storage devices. In some implementations hints indicate the locations of compressed sub-allocation units in one or more back end sub-allocation units and the processor updates the hints in response to a change of size of at least one of the compressed sub-allocation units as a result of the write. In some implementations the processor allocates an additional back end sub-allocation unit in response to the change of size of at least one of the compressed sub-allocation units.

In accordance with an aspect a method comprises: with a storage array comprising a plurality of tangible data storage devices and a computing node comprising a processor and a cache, the computing node presenting a production volume to a host application; in response to an IO request from the host application, the processor determining whether data corresponding to the IO request is in a compressed state or an uncompressed state on the tangible storage devices; the processor copying allocation units of data between the cache and the tangible storage devices to service the IO request when the data is uncompressed; and the processor copying sub-allocation units of data between the cache and the tangible storage devices to service the IO request when the data is compressed, the sub-allocation units having a smaller size than the allocation units. In some implementations the method comprises the processor identifying the sub-allocation units based on one or more of address and sector information in the IO request. In some implementations the method comprises the processor identifying compressed sub-allocation units corresponding to the identified sub-allocation units. In some implementations the method comprises generating hints that indicate the locations of the compressed sub-allocation units in one or more back end sub-allocation units. In some implementations the method comprises generating hints comprising an offset value. In some implementations the method comprises managing one allocation unit corresponding to n sub-allocation units. In some implementations the method comprises the processor responding to a read request by copying compressed data of fewer than n sub-allocation units to cache from the tangible data storage devices. In some implementations the method comprises the processor responding to a write request by destaging compressed data of fewer than n sub-allocation units from the cache to the tangible data storage devices. In some implementations hints indicate the locations of compressed sub-allocation units in one or more back end sub-allocation units and the method comprises the processor updating the hints in response to a change of size of at least one of the compressed sub-allocation units as a result of the write. In some implementations the method comprises the processor allocating an additional back end sub-allocation unit in response to the change of size of at least one of the compressed sub-allocation units.

DETAILED DESCRIPTION

Some aspects, features and implementations described herein may comprise computer devices, components and computer-implemented steps or processes. It should be apparent to those of ordinary skill in the art that the computer-implemented steps or processes may be stored as computer-executable instructions on a non-transitory computer-readable medium. Furthermore, it should be understood by those of ordinary skill in the art that the computer-executable instructions may be executed on a variety of tangible processor devices. For ease of exposition, not every step, process or element is described herein as part of a computer system. Those of ordinary skill in the art will recognize steps, processes and elements that may have a corresponding computer system or software component. Such computer system and software components are therefore enabled by describing their corresponding steps, processes or elements, and are within the scope of the disclosure.

The terminology used in this description is intended to be interpreted broadly within the limits of subject matter eligibility. The terms "logical" and "virtual" are used to refer to features that are abstractions of other features or tangible devices. For example, multiple virtual computing devices could operate simultaneously on one tangible computing device. A "host application" is a computer program that accesses a storage service from a storage system via a storage network. A "volume" is a logical unit of storage presented by a storage system for use by host applications. The storage system manages the underlying tangible storage devices used to implement the storage services for the volume.

Figure 1:
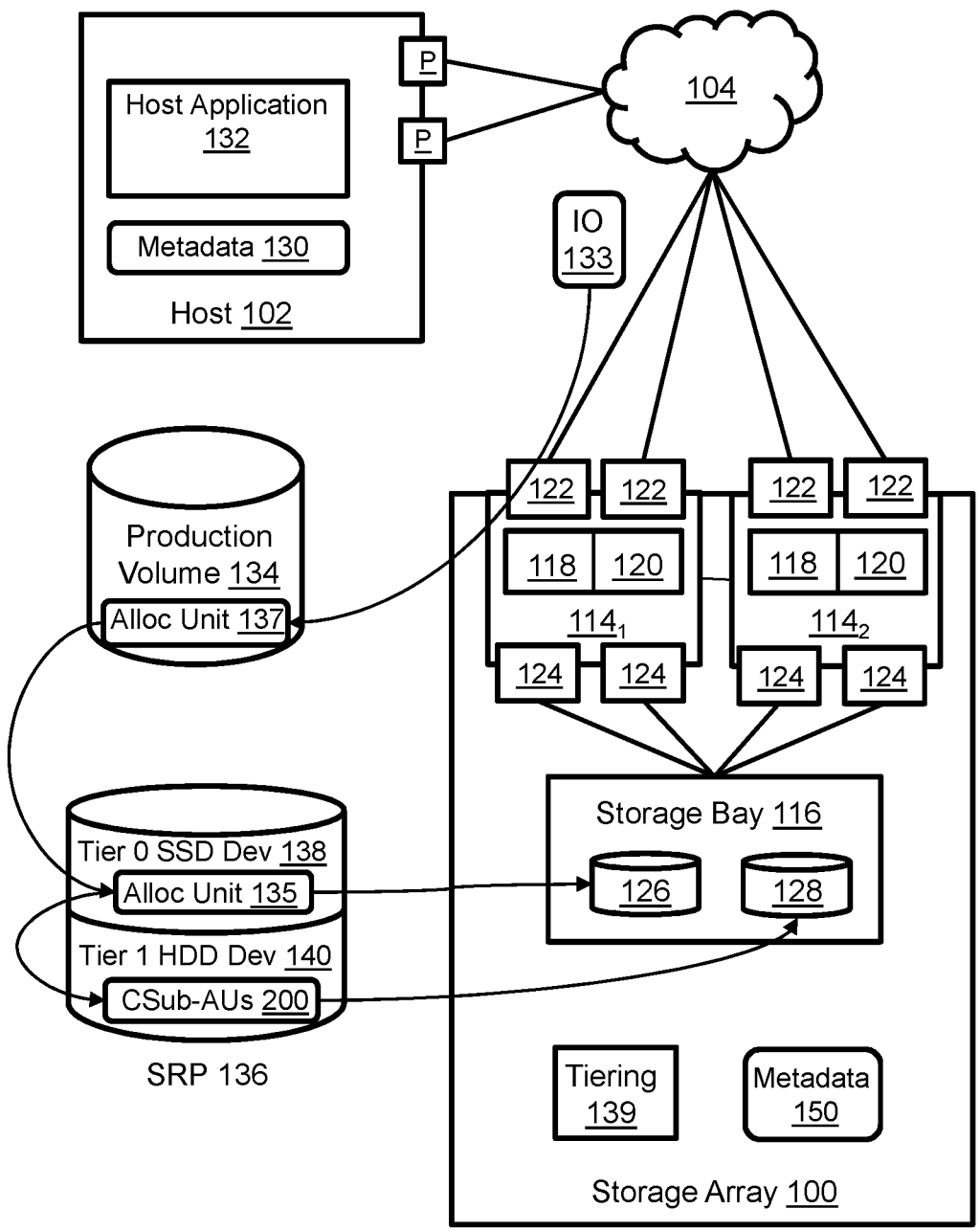
FIG. 1 illustrates a storage array with sub-allocation unit compression domains.

FIG. 1 illustrates an exemplary data storage system with a data storage array 100 and a host device 102. Any number of host devices and storage arrays could be included in the data storage system. The host device 102 is connected to the storage array 100 via a network 104. The network 104 may include various network nodes, e.g. switches, routers, hubs, and other network devices, and may include one or more of the Internet, a WAN (wide area network), MAN (metropolitan area network) and LAN (local area network).

The storage array 100 includes one or more interconnected computing nodes $114_1$-$114_2$ and a storage bay 116. The computing nodes $114_1$-$114_2$ may include "vanilla" storage servers and specialized hardware platforms including but not limited to storage directors and storage engines that are designed for use in storage arrays. Each computing node includes at least one multi-core processor 118 and a cache 120. The cache may include, for example and without limitation, volatile memory such as RAM (random access memory) and high performance SSDs (solid state devices). Each computing node may allocate a portion of its respective cache 120 to a shared "global" cache that can be accessed by other computing nodes. Each computing node is connected to every other computing node in the storage array via point-to-point links of an interconnecting fabric. The computing nodes include FAs (front-end adapters) 122 for communicating with the host 102, and DAs (disk adapters) 124 for communicating with the storage bay 116. The storage bay 116 may include sets of tangible data storage devices of various different technology types, for example and without limitation a set 126 of SSD "flash" drives and a set 128 of HDDs (hard disk drives). The computing nodes $114_1$, $114_2$ maintain at least one logical production volume 134 that is backed by the tangible data storage devices. Without limitation, the production volume may be referred to as a production LUN or host LUN, where LUN (logical unit number) is a number used to identify the logical storage volume in accordance with the SCSI (small computer system interface) protocol.

The host 102 may be a tangible server computer with memory, storage and processors, or a virtual host associated with a virtual machine or container running on a tangible server computer. The host 102 operates a host application 132 that utilizes the storage services of the storage array 100. More particularly, the host application utilizes the production volume 134 which is presented to the host 102 by the storage array 100. There may be any number of host applications running on the host. Examples of host applications include but are not limited to a database, file server and block server. Each host includes one or more ports P. The host ports are connected to the network 104, and each host port may be associated with a network path to a particular storage array port associated with an FA 122. Any number of ports may be included and the hosts do not necessarily have access to all of the front end ports and FAs.

The production volume 134 represents an abstraction layer between the storage bay and the host. The storage array maintains metadata 150 indicative of the location of data in the storage bay. In other words, the computing nodes can use the metadata 150 to determine the actual location of data in the storage bay based on an IO reference to the production volume 134. The data being read or written is temporarily placed in cache 120 while being copied between the host application and the storage bay.

The tangible data storage devices 126, 128 that provide data storage for the production volume 134 are organized as a SRP (storage resource pool) 136. The SRP 136 includes multiple data devices 138, 140. The data devices may be associated with different classes of storage resources. For example, data device 138 may represent an amount of tier 0 storage on some or all SSD resources of the SSDs 126 in the storage bay 116, and data device 140 may represent an amount of tier 1 storage on some or all of the HDDs 128 in the storage bay. The production volume 134 (or a storage group of multiple production volumes) may be associated with a SLO (service level objective) that indicates demands for quality of service measured by response time to IO access to that production volume. For example, the SLO for production volume 134 may indicate an IO response time of no greater than 5 ms in order to enable the host application 132 to provide a target level of performance or user experience. Failing to satisfy the SLO does not necessarily cause the host application to become non-functional, but user experience may fall below expectations. The performance tier composition of the SRP 136 may be selected to help satisfy the SLO. Further, a storage tiering program 139 may be implemented by the computing nodes to promote relatively active data (recently accessed) to higher performance storage media, e.g. to tier 0 SSD resources of data device 138, and demote relatively inactive data (not recently accessed) to lower performance storage media, e.g. to tier 1 HDDs of data device 140. Further, some or all of the data on data device 140 may be compressed. Promotion and demotion of extents of data may occur periodically or continuously as activity levels change.

The production volume 134 and the tangible data storage devices 126, 128 in the storage bay 116 each have a total storage capacity that is organized into various fixed size units of storage capacity for management purposes. A sector may be the smallest unit of storage that a tangible storage device processes, e.g. providing a sector in response to a read or overwriting a sector in response to a write. On a spinning disk HDD a track may correspond to a concentric band on the disk and a sector may be a portion of such a concentric band. 1 sector may be 512 bytes. 1 block may be 8 sectors. 1 track may be 32 sectors. 1 cylinder may be 15 tracks. The host 102 maintains metadata 130 indicating which locations on the production volume 134 are available and which data is already stored at particular locations. The host application 132 requests IOs (input and output operations) with reference to the production volume 134 by specifying locations using one or more of the fixed size units of storage and addresses indicated by the metadata 130, e.g., specifying a track number, sector and address.

In order for the storage array metadata 150 to be manageable, a fixed size "allocation unit" of storage capacity may be used by the computing nodes as a basic unit for processing IOs. For example and without limitation, the computing nodes may read and write from and to the storage bay in fixed size allocation units such as tracks. The size of the allocation units is generally proportional to the manageability of the metadata, but inversely proportional to resource utilization efficiency when retrieving data from persistent storage. The inventors have recognized that in certain circumstances it may be advantageous to process IOs in units of a fixed size other than the allocation units. For example, the extra processing overhead incurred by unnecessarily compressing and decompressing some data in allocation units may offset or negate the increase in metadata manageability. That overhead may be reduced by using smaller compression domains, i.e. sub-allocation units, for compressed data. While tracks may be referred to as the fundamental allocation units it should be understood that allocation units may be any fixed size that is greater than the smallest unit on a drive and less than the drive in its entirety. Moreover, tracks are not necessarily 128 kb in size.

Figure 2:
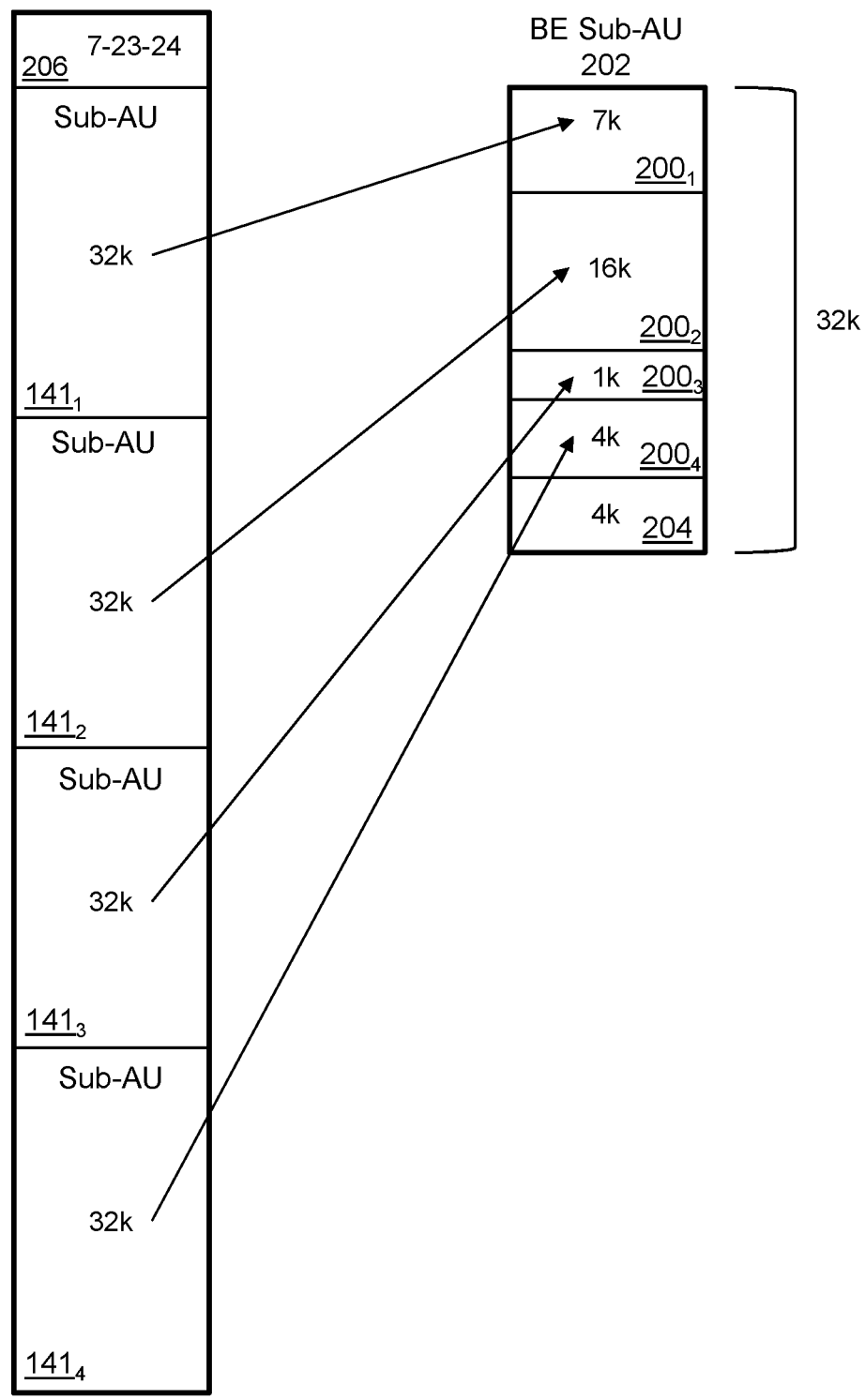
FIG. 2 illustrates an implementation of the sub-allocation unit compression domains.

Referring now to FIGS. 1 and 2, active data may be stored uncompressed and managed in fixed size allocation units while other less active data may be stored in a compressed state and managed in sub-allocation unit compression domains. The sub-allocation units have greater granularity (smaller size) than the allocation units, e.g. and without limitation 32 kb quarter-track sized units of storage. In the illustrated example an allocation unit 135 (on device 138) contains a 128 kb track of uncompressed data of a corresponding 128 kb track in allocation unit 137 (on production volume 134) when the data resides on device 138, e.g. when the data is active. However, the data may be organized into multiple compressed sub-allocation units (collectively 200 in FIG. 1, and individually $200_1$-$200_4$ in FIG. 2) when the data resides on device 140, e.g. when the data activity level drops. In order to generate the corresponding compressed sub-allocation units 200 the allocation unit 135 is organized into multiple fixed size sub-allocation units $141_1$-$141_4$, each of which is a 32 kb chunk of the 128 kb allocation unit 135. The sub-allocation units may be of a uniform size that is a factor of the size of the allocation unit. The uncompressed 32 kb sub-allocation units $141_1$-$141_4$ may be individually reduced in size by a compression algorithm to yield the respective compressed sub-allocation units $200_1$-$200_4$. The data may be moved in either direction between device 138 and device 140 by the tiering program 139, for example and without limitation, as the data becomes more or less active. Consequently, the data may be re-organized into allocation units and sub-allocation units.

Tangible storage devices 128 may also be organized and managed in terms of sub-allocation units. In the illustrated example a BE (back end) sub-allocation unit 202 has a 32 kb size. Compressed data size values are shown without limitation and strictly to provide context. Sub-allocation unit $141_1$ is compressed from 32 kb to 7 kb, yielding compressed sub-allocation unit $200_1$. Sub-allocation unit $141_2$ is compressed from 32 kb to 16 kb, yielding compressed sub-allocation unit $200_2$. Sub-allocation unit $141_3$ is compressed from 32 kb to 1 kb, yielding compressed sub-allocation unit $200_3$. Sub-allocation unit $141_4$ is compressed from 32 kb to 4 kb, yielding compressed sub-allocation unit $200_4$. Because BE sub-allocation unit 202 is 32 kb in size, a 4 kb pad 204 remains.

A hint field 206 in allocation unit 137 provides hints to indicate where each associated compressed sub-allocation unit resides within the corresponding BE sub-allocation unit 202. For example and without limitation, the hints could include offsets or pointers into the BE sub-allocation unit. In the illustrated example the hints 7-23-24 are offsets into BE sub-allocation unit 202 indicating that compressed sub-allocation unit $200_2$ is offset 7 k into BE sub-allocation unit 202, compressed sub-allocation unit $200_3$ is offset 23 k (7+16=23) and compressed sub-allocation unit $200_4$ is offset 24 k (7+16+1=24). Compressed sub-allocation unit $200_1$ has no offset. Thus, each individual compressed sub-allocation unit may be located and decompressed without necessarily decompressing other compressed sub-allocation units in the same BE sub-allocation unit. The hints may be maintained in various locations, of which allocation units 135, 137 are examples. Other examples include the BE sub-allocation unit 202.

Figure 3:
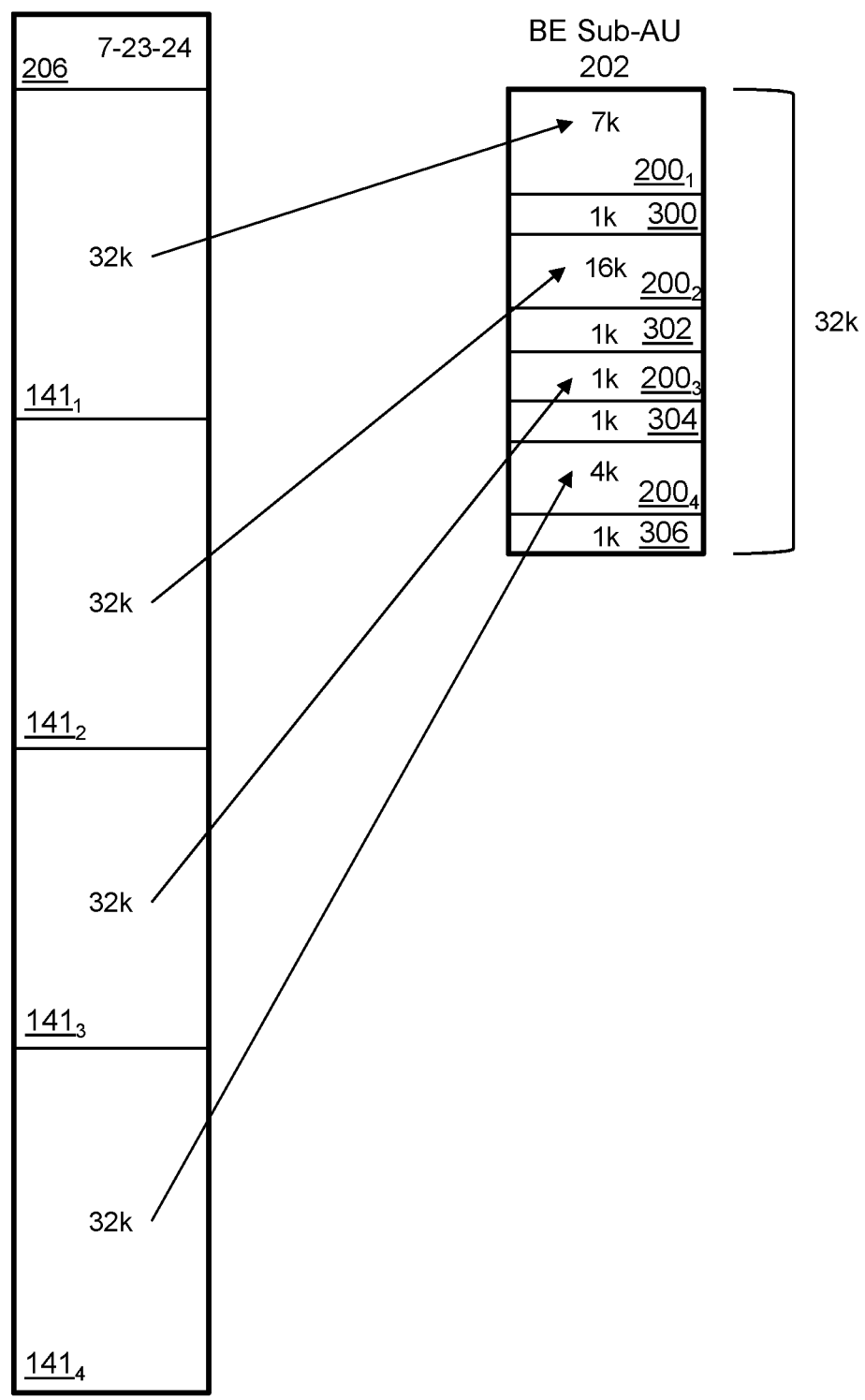
FIG. 3 illustrates another implementation of the sub-allocation unit compression domains.

FIG. 3 illustrates another implementation of the compression domains. In this implementation the available space that remains in the BE sub-allocation unit 202 is distributed. For example, multiple pads may be evenly or proportionally distributed among the compressed sub-allocations. In the illustrated example there are four 1 k pads 300, 302, 304, 306 rather than the single 4 k pad 204 shown in FIG. 2. A wide variety of pad sizing and placement techniques could be implemented.

Figure 4:
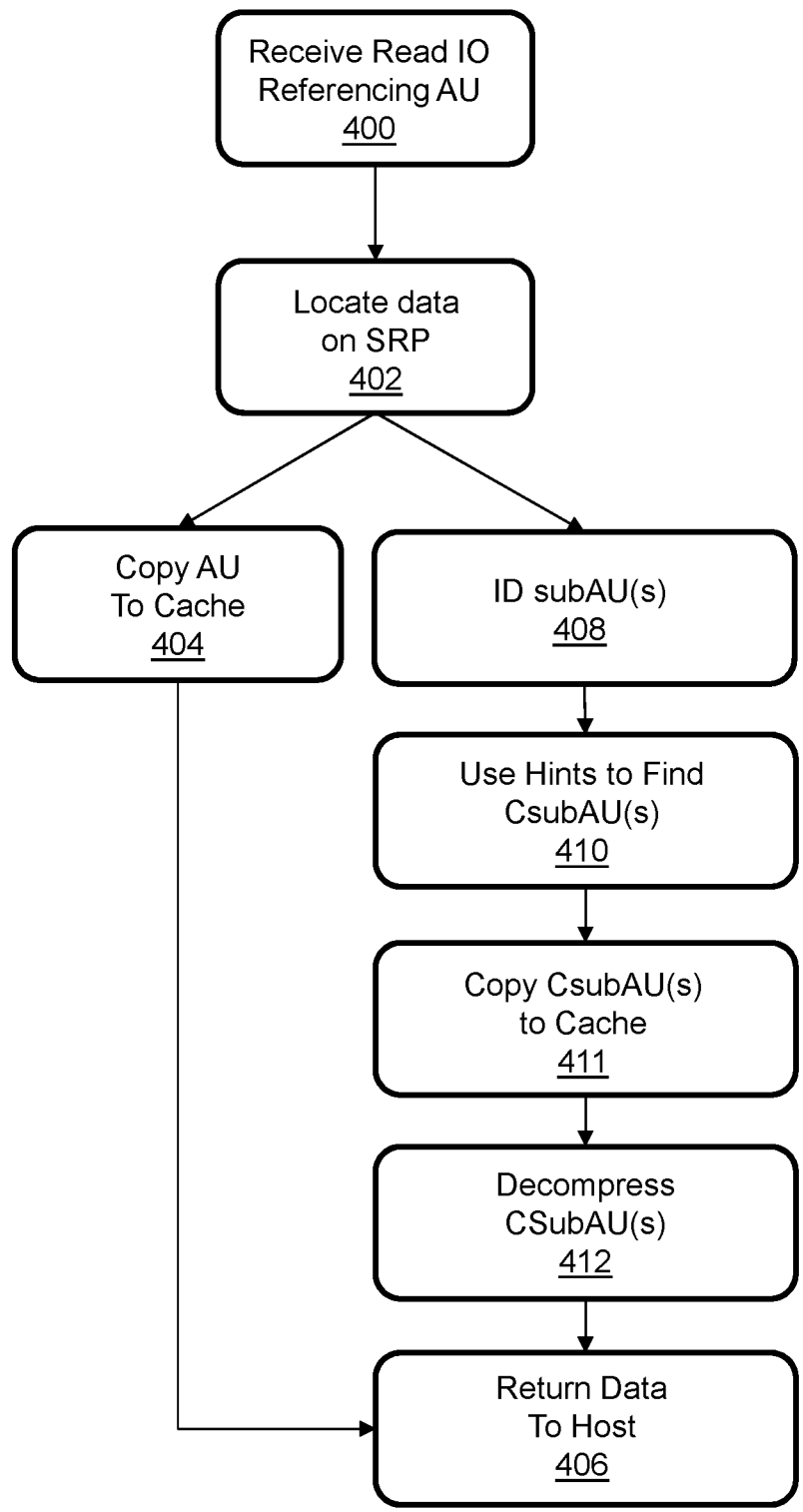
FIG. 4 illustrates a method for the storage array to perform a read of data from compressed sub-allocation units.

An exemplary read will now be described with reference to FIGS. 1, 2 and 4. In order to read data from the storage array the host application 132 uses the metadata 130 to create IO 133 as a read request. The read request may identify the target data by referencing allocation unit 137 on the production volume 134, e.g. by specifying one or more of the address, sector, track number and cylinder. The storage array receives the read request as indicated at block 400. In response to receipt of the read request one of the computing nodes locates the corresponding data on SRP 136 as shown in block 402. If the corresponding data is in uncompressed allocation unit 135 on device 138 then the computing node copies allocation unit 135 from the storage bay to the cache as shown in block 404. For purposes of explanation it is assumed that the data is not already resident in the cache. The requested data, which may comprise only a portion of allocation unit 135, is then returned to the host as indicated in block 406. If the corresponding data is in the group of sub-allocation units $141_1$-$141_4$ on device 140 then the computing node uses the information in the read request to identify the specific sub-allocation units required to service the read as shown in block 408. For example, address and sector information may be used to identify the specific sub-allocation units. A partial read of less than the entire track may correspond to data that is entirely available from sub-allocation unit $141_2$ so it may not be necessary to retrieve sub-allocation units $141_1$, $141_3$, $141_4$. The hints are used to find the corresponding compressed sub-allocation unit (or units) that contain the requested data as indicated in block 410. For example, the offset value 7 in hint field 206 shows the location of compressed sub-allocation unit $200_2$ corresponding to sub-allocation unit $141_2$. The identified compressed sub-allocation unit (or units) are copied to the cache as indicated in block 411. The compressed copy in cache is decompressed as indicated in block 412. The requested data, which may be less than the entire sub-allocation unit, is then returned to the host as indicated in block 406. Savings of cpu and cache resources may be realized in comparison with retrieval and decompression of all compressed sub-allocation units because the non-required compressed sub-allocation units are not decompressed or copied to cache. For example and without limitation, from one to three quarter tracks may be decompressed rather than an entire track.

Figure 5:
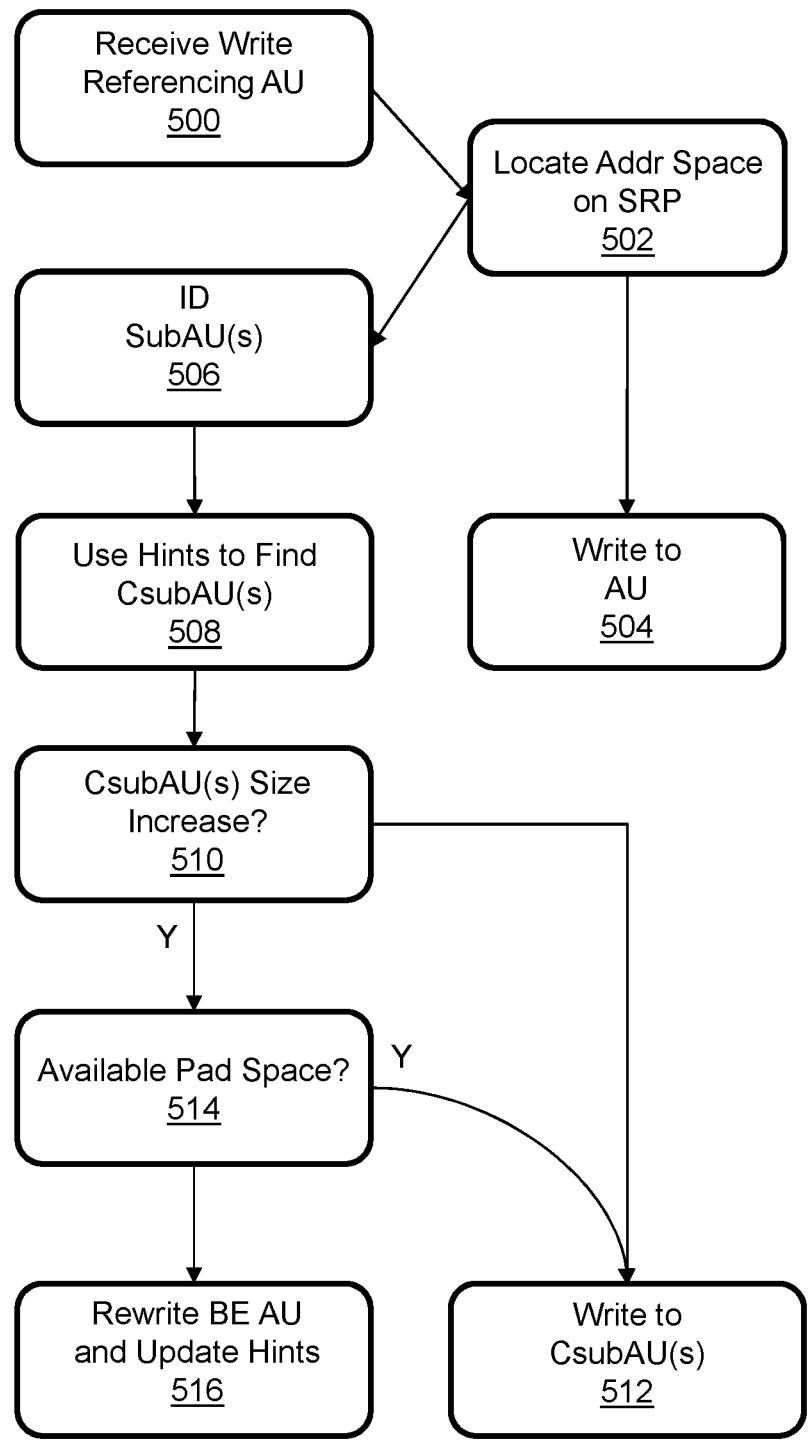
FIG. 5 illustrates a method for the storage array to perform a write to compressed sub-allocation units.

An exemplary write will now be described with reference to FIGS. 1, 2 and 5. In order to write data to the storage array the host application 132 uses the metadata 130 to create IO 133 as a write request. The write request may include data and identify the target allocation unit 137 on the production volume 134, e.g. by specifying one or more of the address, sector, track number and cylinder. The storage array receives the write request as indicated at 500. In response to receipt of the write request one of the computing nodes locates or allocates corresponding address space on SRP 136 as shown in block 502. If the corresponding address space is uncompressed allocation unit 135 on device 138 then the computing node writes the data to that allocation unit as indicated in block 504. For example, the data may be written to the cache and subsequently destaged to the storage bay.

If the corresponding address space is the group of sub-allocation units $141_1$-$141_4$ on device 140 then the computing node uses the information (e.g. address and sector) in the write request to identify the specific sub-allocation units required to service the write as shown in block 506. For example, a partial write may correspond to data being written only to sub-allocation unit $141_2$ so it may not be necessary to modify the other sub-allocation units $141_1$, $141_3$, $141_4$. The hints are used to find the corresponding compressed sub-allocation unit(s) that contain the address space as indicated in block 508. The data being written is then compressed and compared with the corresponding compressed sub-allocation unit(s) to determine whether there is a size increase as indicated in block 510. In other words, it is determined whether the data being written to each sub-allocation unit will fit (compressed) within the space allocated to the corresponding compressed sub-allocation unit. If there is no size increase then the compressed data (i.e. the compressed version of the data being written) is written to the corresponding compressed sub-allocation unit(s) as indicated in block 512. If there is an increase in size then a determination is made as to whether there is available contiguous pad space to accommodate the size increase as indicated in block 514. If there is enough available contiguous pad space to accommodate the size increase then the compressed data (i.e. the compressed version of the data being written) is written to the corresponding compressed sub-allocation unit as indicated in block 512 and some or all of the pad space is utilized. If there is not enough available contiguous pad space to accommodate the size increase then the BE sub-allocation unit is rewritten and the hints are updated as indicated in block 516 and explained in greater detail below.

Figure 6:
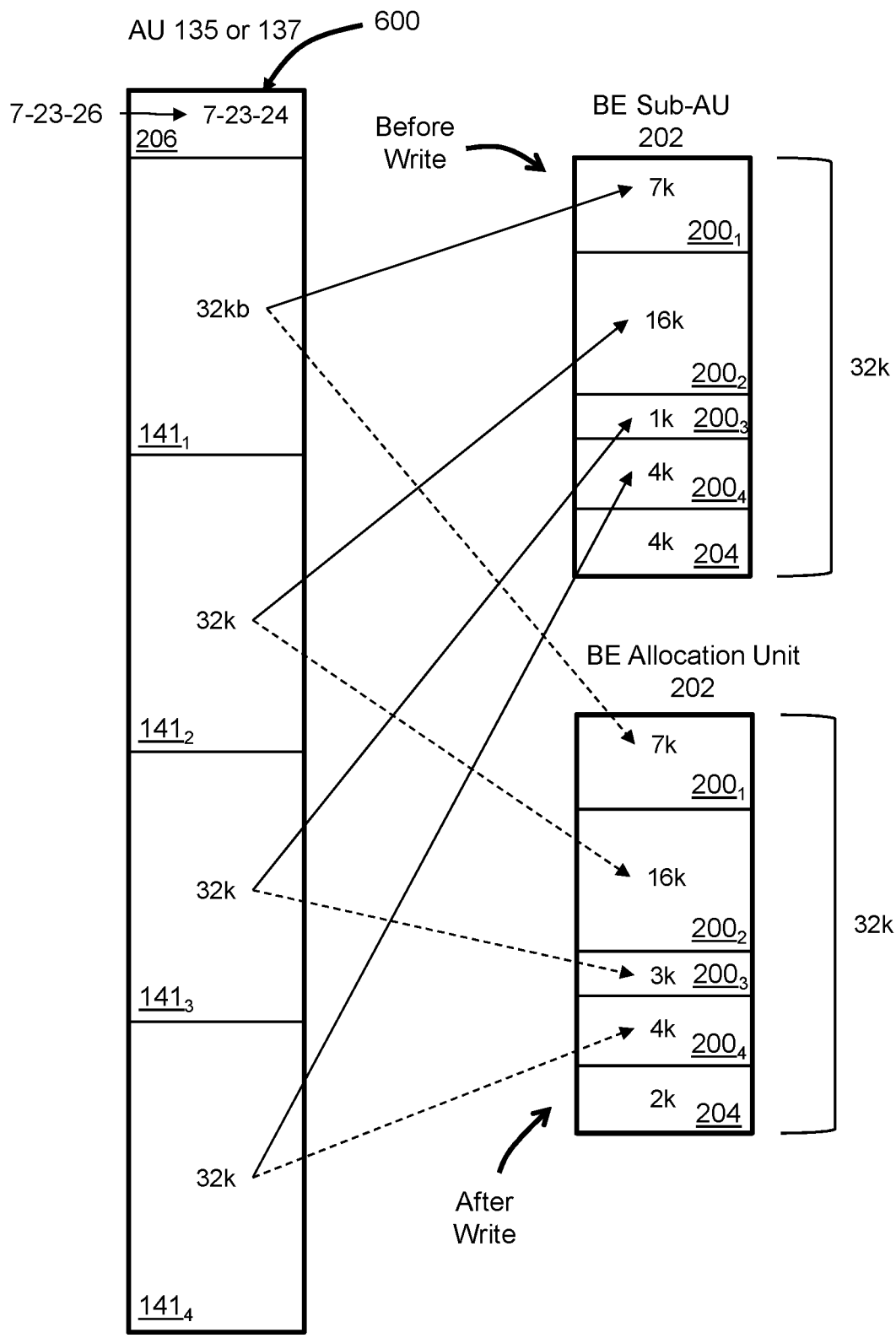
FIG. 6 illustrates an implementation of a write to the compressed sub-allocation units where the size of the compressed data increases.

FIG. 6 illustrates an example in which the BE sub-allocation unit 202 is rewritten and the hints 600 updated. A write is made to sub-allocation unit $141_3$. The write does not change data in the other sub-allocation units $141_1$, $141_2$, $141_4$. However, as a result of the write the size of compressed sub-allocation unit $200_3$ is increased from 1 k to 3 k. Because there is no contiguous pad space to accommodate the size increase a portion of the address space that was allocated to compressed sub-allocation unit $200_4$ is utilized. Compressed sub-allocation unit $200_4$ is rewritten using 2 k of the contiguous pad space 204. The remaining pad is 2 k in size. Consequently, the offset to compressed sub-allocation unit $200_4$ is updated from 24 to 26, yielding updated hints 7-23-26. The updated hints are written to the hint field 206.

Figure 7:
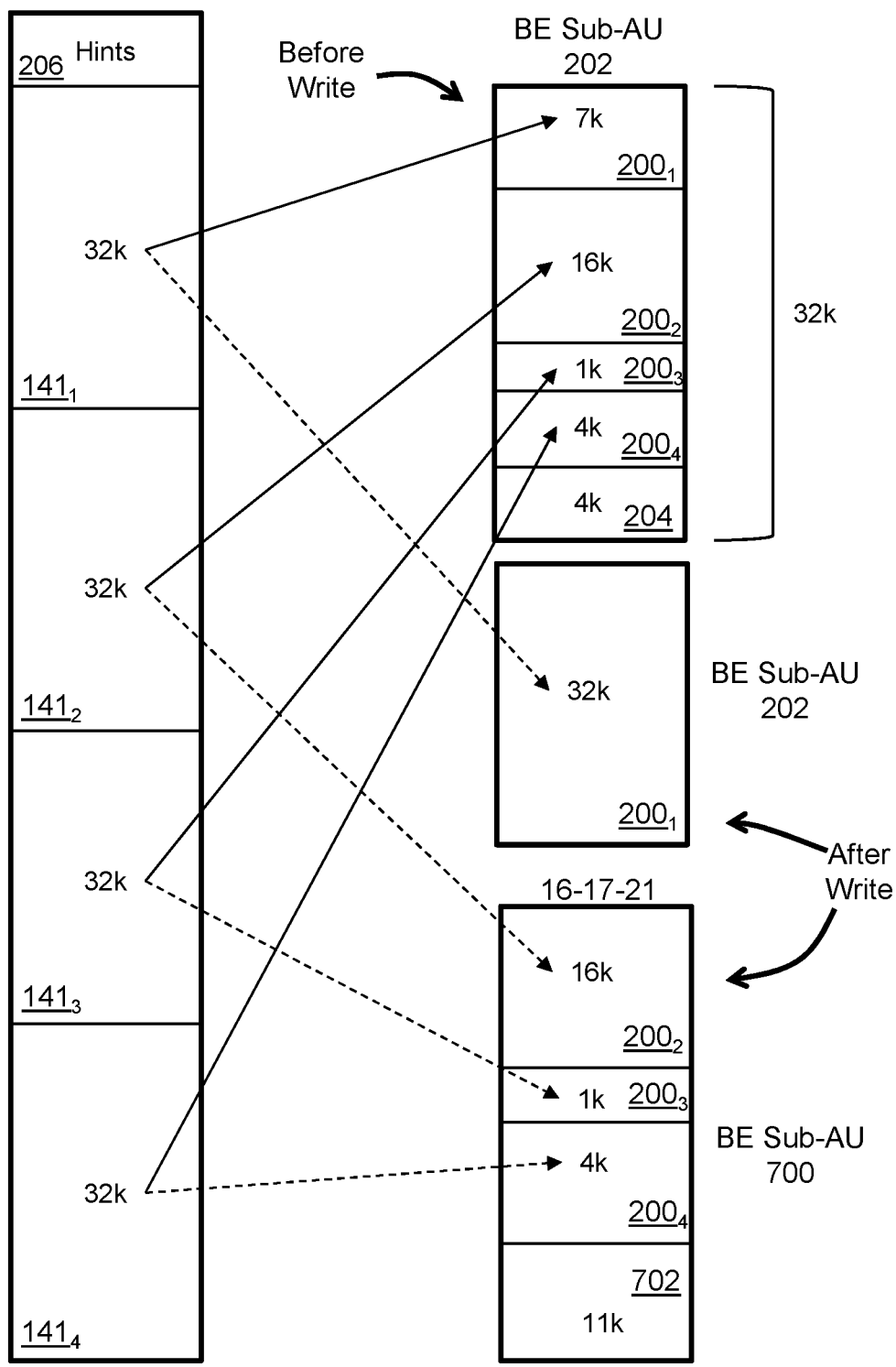
FIG. 7 illustrates another implementation of a write to the compressed sub-allocation units where the size of the compressed data increases.

FIG. 7 illustrates another example in which the BE sub-allocation unit 202 is rewritten and the hints 600 updated. A write is made to sub-allocation unit $141_1$. The write does not change data in the other sub-allocation units $141_2$, $141_3$, $141_4$. However, as a result of the write the size of compressed sub-allocation unit $200_1$ is increased from 7 k to 32 k. Because the resulting compressed allocation sub-units exceed the BE sub-allocation unit size of 32 kb an additional BE sub-allocation unit 700 is allocated. Compressed sub-allocation unit $200_1$ is rewritten using 32 k of BE sub-allocation unit 202. Compressed sub-allocation units $200_2$, $200_3$, $200_4$ are rewritten using BE sub-allocation unit 700. An 11 k pad 702 may be written to the end of BE sub-allocation unit 700 or distributed. Updated hints are written to the hint field 206.

A number of features, aspects, embodiments and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. An apparatus comprising:
   a storage array comprising:
      a plurality of tangible data storage devices; and
      a computing node comprising a processor and a cache, wherein the computing node presents a production volume to a host application and, in response to first and second IO requests from the host application, the processor determines that first data corresponding to the first IO request is to be stored in a compressed state and that second data corresponding to the second IO request is to be stored in an uncompressed state, and wherein the processor prompts storage of fixed size allocation units of the first data on the tangible storage devices to service the first IO request, and wherein the processor prompts compression of sub-allocation units of the second data to service the second IO request, each sub-allocation unit comprising a compression domain having a smaller size than ones of the fixed size allocation units of the first data, resulting compressed sub-allocation units of data being stored on the tangible storage devices.

2. The apparatus of claim 1 wherein the processor identifies the sub-allocation units based on one or more of address and sector information in a third IO request.

3. The apparatus of claim 2 wherein the processor identifies the compressed sub-allocation units corresponding to the identified sub-allocation units.

4. The apparatus of claim 3 comprising hints that indicate the locations of the compressed sub-allocation units in one or more back end sub-allocation units.

5. The apparatus of claim 4 wherein the hints comprise an offset value.

6. The apparatus of claim 1 wherein one allocation unit corresponds to n sub-allocation units.

7. The apparatus of claim 6 wherein the processor responds to a read request by copying compressed data of fewer than n sub-allocation units to cache from the tangible data storage devices.

8. The apparatus of claim 1 wherein the processor responds to a write request by destaging compressed data of fewer than n sub-allocation units from the cache to the tangible data storage devices.

9. The apparatus of claim 8 wherein hints indicate the locations of compressed sub-allocation units in one or more back end sub-allocation units and the processor updates the hints in response to a change of size of at least one of the compressed sub-allocation units as a result of the write.

10. The apparatus of claim 9 wherein the processor allocates an additional back end sub-allocation unit in response to the change of size of at least one of the compressed sub-allocation units.

11. A method comprising:
with a storage array comprising a plurality of tangible data storage devices and a computing node comprising a processor and a cache, the computing node presenting a production volume to a host application;
in response to first and second IO requests from the host application, the processor determining that first data corresponding to the first IO request is to be stored in a compressed state and that second data corresponding to the second IO request is to be stored in an uncompressed state;
the processor prompting storage of fixed size allocation units of the first data on the tangible storage devices to service the first IO request; and
the processor prompting compression of sub-allocation units of the second data to service the second IO request, each sub-allocation unit comprising a compression domain having a smaller size than ones of the fixed size allocation units of the first data, resulting compressed sub-allocation units of data being stored on the tangible storage devices.

12. The method of claim 11 comprising the processor identifying the sub-allocation units based on one or more of address and sector information in a third IO request.

13. The method of claim 12 comprising the processor identifying the compressed sub-allocation units corresponding to the identified sub-allocation units.

14. The method of claim 13 comprising generating hints that indicate the locations of the compressed sub-allocation units in one or more back end sub-allocation units.

15. The method of claim 14 comprising generating hints comprising an offset value.

16. The method of claim 11 comprising managing one allocation unit corresponding to n sub-allocation units.

17. The method of claim 16 comprising the processor responding to a read request by copying compressed data of fewer than n sub-allocation units to cache from the tangible data storage devices.

18. The method of claim 11 comprising the processor responding to a write request by destaging compressed data of fewer than n sub-allocation units from the cache to the tangible data storage devices.

19. The method of claim 18 wherein hints indicate the locations of compressed sub-allocation units in one or more back end sub-allocation units and comprising the processor updating the hints in response to a change of size of at least one of the compressed sub-allocation units as a result of the write.

20. The method of claim 19 comprising the processor allocating an additional back end sub-allocation unit in response to the change of size of at least one of the compressed sub-allocation units.

* * * * *